United States Patent
Romeo

(10) Patent No.: US 10,985,655 B1
(45) Date of Patent: Apr. 20, 2021

(54) PEAK CURRENT LIMIT IN A SLOPE-COMPENSATED CURRENT MODE DC-DC CONVERTER

(71) Applicant: SEMICONDUCTOR COMPONENTS INDUSTRIES, LLC, Phoenix, AZ (US)

(72) Inventor: Dominique Romeo, Montauban (FR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 35 days.

(21) Appl. No.: 16/674,143

(22) Filed: Nov. 5, 2019

Related U.S. Application Data

(60) Provisional application No. 62/907,252, filed on Sep. 27, 2019.

(51) Int. Cl.
  *H02M 3/156* (2006.01)
  *H02M 1/00* (2006.01)

(52) U.S. Cl.
  CPC .... *H02M 3/156* (2013.01); *H02M 2001/0025* (2013.01)

(58) Field of Classification Search
  CPC ...... H02M 3/145; H02M 3/155; H02M 3/156; H02M 3/157; H02M 3/158; H02M 2001/0025; H02M 2003/1566
  See application file for complete search history.

(56) References Cited

U.S. PATENT DOCUMENTS

| | | | |
|---|---|---|---|
| 8,310,221 B2 | 11/2012 | Herzer et al. | |
| 8,698,475 B2 | 4/2014 | Dong et al. | |
| 9,467,051 B2 | 10/2016 | Stoichita et al. | |
| 2009/0302820 A1* | 12/2009 | Shimizu | H02M 3/156 323/285 |
| 2010/0164563 A1* | 7/2010 | Bea | H03K 7/08 327/132 |
| 2010/0253309 A1 | 10/2010 | Xi et al. | |
| 2015/0200593 A1* | 7/2015 | Stoichita | H02M 3/156 323/271 |
| 2018/0152102 A1* | 5/2018 | Mengad | H03K 4/00 |

OTHER PUBLICATIONS

"1A High-Efficiency Step-Down DC-DC Converter," Product Brochure FAN2001/FAN2002 Rev. 1.0.2, Apr. 2005, 13 pages, Copyright Semiconductor Components Industries, LLC.

* cited by examiner

*Primary Examiner* — Adolf D Berhane
(74) *Attorney, Agent, or Firm* — Dickinson Wright PLLC; Mark E. Scott

(57) ABSTRACT

Slope-compensated current mode DC-DC converters. Example embodiments are methods of operating a slope-compensated current mode DC-DC converter including asserting a pulse width modulation (PWM) signal in a switching period to couple an input voltage to the inductor; sensing an inductor current through an inductor to generate a sensed current signal; generating a slope compensation signal having a peak amplitude during the switching period; generating a slope offset signal based on a sum of a predefined threshold with a product of a duty cycle of the PWM signal and the peak amplitude; and de-asserting the PWM signal during the switching period based on the sensed current signal and the slope offset signal.

20 Claims, 10 Drawing Sheets

US 10,985,655 B1

PEAK CURRENT LIMIT IN A SLOPE-COMPENSATED CURRENT MODE DC-DC CONVERTER

CROSS-REFERENCE TO RELATED APPLICATIONS

This application claims the benefit of U.S. Provisional Patent Application No. 62/907,252, filed on Sep. 27, 2019, the entire contents of which is incorporated herein by reference.

BACKGROUND

Peak current limit protection is commonly used with DC-DC converters to prevent damage that can result from excessive current. Conventional peak current limitation causes an output current to be halted when current exceeds a peak value. However, conventional peak current limitation can result in instability and subharmonic regulation, especially with duty ratios exceeding 50%. Slope compensation may be used to address some of the issues with conventional peak current limitation. However, conventional slope compensation can result in reduced accuracy, especially at relatively high duty ratios.

BRIEF DESCRIPTION OF THE DRAWINGS

For a detailed description of example embodiments, reference will now be made to the accompanying drawings in which.

DEFINITIONS

Figure 1:
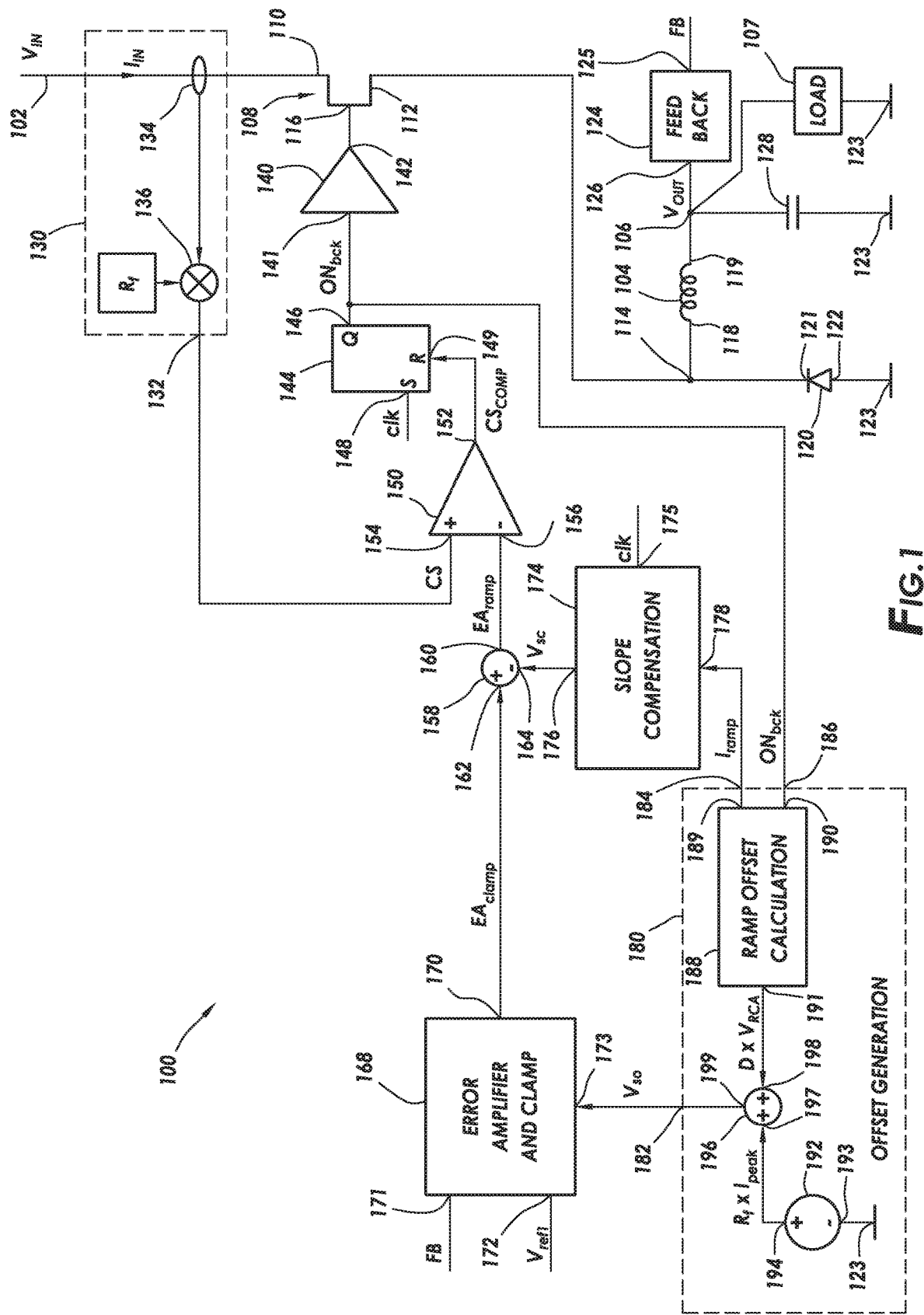
FIG. 1 shows a combination electrical schematic and block diagram of a DC-DC converter in accordance with at least some embodiments.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Controller" shall mean, alone or in combination, individual circuit components, an application specific integrated circuit (ASIC), a microcontroller with controlling software, a digital signal processor (DSP), a processor with controlling software, or a field programmable gate array (FPGA), configured to read inputs and drive outputs responsive to the inputs.

In relation to electrical devices, the terms "input" and "output" refer to electrical connections to the electrical devices, and shall not be read as verbs requiring action. For example, a controller may have a gate output and one or more sense inputs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Example embodiments are directed to DC-DC power converters for converting a direct current (DC) input voltage $V_{IN}$ from a power source to an output voltage $V_{OUT}$ to be supplied to a load. The power source may be a battery or another power supply or converter circuit, such as a power factor correcting (PFC) converter. More specifically, various example embodiments are directed to slope compensated current mode DC-DC power converters, which may be called current mode DC-DC converters, for short.

DC-DC power converters constructed in accordance with the present disclosure may provide several advantages over conventional designs. For example, the present disclosure may enable DC-DC power converters that can achieve accurate current limitation in clocked applications without subharmonic oscillation. DC-DC power converters constructed in accordance with the present disclosure may provide cycle-by-cycle limitations by clamping an error amplifier for good recovery out of regulation. Control methods and circuits of the present disclosure may also be applied to current loop control in DC-DC converters to control for peak current in clocked applications (e.g. for fixed frequency LED drivers). The specification now describes an example current mode DC-DC converter to orient the reader.

FIG. 1 shows a DC-DC converter, which may also be called a DC-DC power converter. More specifically, FIG. 1 shows a current mode DC-DC converter 100 in accordance with at least some embodiments. The current mode DC-DC converter 100 of FIG. 1 is configured to control flow of current from an input terminal 102 through an inductor 104 and to energize an output node 106 with the output voltage $V_{OUT}$, thus providing power to a load 107 that is connected to the output node 106. Specifically, the current mode DC-DC converter 100 of FIG. 1 comprises a switching field effect transistor (FET) 108 to control the flow of current from the input terminal 102 to the inductor 104. The switching FET 108 is an example used in many cases; however, the switching FET 108 is representative of any device that may be used as an electrically controlled switch (e.g., transistors, junction transistors, Gallium nitride (GaN) High-electron-mobility transistors (HEMT), silicon carbide (SiC) devices, FETs of other types, and silicon controlled rectifiers). The switching FET 108 has a drain 110 coupled to the input terminal 102, and a source 112 coupled to a switch node 114. The switching FET 108 also has a gate 116. The inductor 104 defines a first lead 118 coupled to the switch node 114, and a second lead 119 coupled to the output node 106. The switching FET 108 is configured to selectively couple the input voltage $V_{IN}$ to the inductor 104 in response to assertion of the gate 116.

The current mode DC-DC converter 100 also includes a rectifier 120 defining a first rectifier lead 121 and a second rectifier lead 122. The first rectifier lead 121 is connected to the switch node 114 and the second rectifier lead 122 is connected to a common or ground 123. More specifically, the rectifier 120 shown in FIG. 1 is configured to conduct current from the ground 123 to the switch node 114 while blocking current flow in an opposite direction. In at least some embodiments, and as shown in FIG. 1, the rectifier 120 includes a single diode, but other rectifier arrangements may be used (e.g. a switching rectifier). The example current mode DC-DC converter 100 further comprises an output capacitor 128 coupled across the output node 106 and the ground 123. The output capacitor 128 smooths the output voltage $V_{OUT}$.

A feedback circuit 124 includes a feedback output 125 and an input terminal 126 connected to the output node 106 of the DC-DC converter 100. The feedback circuit 124 is configured to generate a feedback signal FB upon the feedback output 125. In some embodiments, the feedback signal FB represents the output voltage Vout. For example, the feedback signal FB may have a voltage that is proportional to the output voltage Vout. The feedback circuit 124 may include, for example, a voltage divider and/or an amplifier to generate the feedback signal FB as a function of the output voltage Vout. In some embodiments, the feedback signal FB represents a current supplied by the DC-DC converter 100 to the load 107. The feedback circuit 124 may generate the feedback signal FB as a function of current using a current sensor (not shown) or by measuring a differential voltage across a shunt resistor (not shown) to measure an amount of current flowing through the shunt resistor. The feedback signal FB representing current may be used, for example, where the DC-DC converter 100 is configured as a light emitting diode (LED) driver.

A current sensor 130 includes a current signal output 132. The current sensor 130 senses an input current $I_{IN}$ from the input terminal 102 and generates a sensed current signal CS upon the current signal output 132, with the sensed current signal CS proportional to the input current $I_{IN}$. In the example DC-DC converter 100 of FIG. 1, the current sensor 130 includes a current pickup 134 coupled to a current amplifier 136 to generate the sensed current signal CS upon the current signal output 132. The current amplifier 136 generates the current signal CS as a function of the input current $I_{IN}$ and a current sense gain resistance $R_f$. The current pickup 134 may include a coil inductively coupled to a conductor carrying the input current $I_{IN}$ to measure the input current $I_{IN}$. The current pickup 134 and/or the current amplifier 136 may have other configurations (not shown), which may include, for example, a shunt resistor and/or a voltage divider comprising two or more resistors.

A gate driver 140 defines an input 141 and a driver output 142 connected to the gate 116 of the switching FET 108. The gate driver 140 is configured to energize the driver output 142 and to thereby cause the switching FET 108 to be in a conductive state in response to assertion of the input 141.

The current mode DC-DC converter 100 also includes a latch circuit 144 defining a latch output 146 coupled to the gate 116 of the switching FET 108. More specifically, the latch output 146 of the latch circuit 144 is coupled to the input 141 of the gate driver 140 for directing the gate driver 140 to energize the driver output 142 and to thereby cause the switching FET 108 to be in a conductive state. The latch circuit 144 also defines a set input 148 and a reset input 149. The latch circuit 144 is configured to drive and hold the latch output 146 in an asserted condition (i.e. to latch) in response to the set input 148 being asserted. The latch circuit 144 is also configured to de-assert the latch output 146 (i.e. to unlatch) in response to the reset input 149 being asserted. In at least some embodiments, and as shown in FIG. 1, the latch circuit 144 includes a set-reset (SR) circuit, but other arrangements may be used (e.g. a JK flip-flop). The set input 148 is coupled to a clock output of an oscillator circuit (not shown) for receiving a periodic clock signal clk. The latch circuit 144, thus generates a PWM signal $ON_{bck}$ upon the latch output 146 and which varies with frequency of the clock signal and the timing of the reset input 149.

Still referring to FIG. 1, the current mode DC-DC converter 100 also includes a comparator 150 defining a comparison output 152 connected to the reset input 149 of the latch circuit 144. The comparator 150 also defines a non-inverting input 154 and an inverting input 156. The non-inverting input 154 is connected to the current signal output 132 of the current sensor 130 for monitoring the sensed current signal CS therefrom. The comparator 150 is configured generate a comparison signal $CS_{comp}$ upon the comparison output 152 by asserting the comparison output 152 in response to the sensed current signal CS upon the non-inverting input 154 exceeding a ramped error signal $EA_{ramp}$ upon the inverting input 156. The comparison signal $CS_{comp}$ causes the latch output 146 of the latch circuit 144 to be de-asserted, thus causing the switching FET 108 to prevent current flow from the input terminal 102 to the inductor 104. This function defines a current-control loop of the current mode DC-DC converter.

A first summer 158 defines an output 160 and a first input 162 having a clamped error signal $EA_{clamp}$ and a second input 164 having a slope compensation signal $V_{SC}$ The first summer 158 is configured generate the ramped error signal $EA_{ramp}$ upon the output 160 as a difference of the clamped error signal $EA_{clamp}$ from the first input 162 and the slope compensation signal $V_{SC}$ from the second input 164. In the example shown in FIG. 1, the first summer 158 is configured to subtract a positive-biased slope compensation signal $V_{SC}$ from the clamped error signal $EA_{clamp}$. In other embodiments, first summer 158 may be configured to add a negative-biased slope compensation signal $V_{SC}$ to the clamped error signal $EA_{clamp}$ to generate the ramped error signal $EA_{ramp}$.

An error amplifier 168 defines a clamped error output 170 coupled to the first input 162 of the first summer 158 to provide the clamped error signal $EA_{clamp}$. The error amplifier 168 also defines a feedback input 171, a reference input 172, and a clamp input 173 having a slope offset signal $V_{SO}$. The feedback input 171 is configured to receive the feedback signal FB from the feedback output 125 of the feedback circuit 124, as indicated by the FB symbol at the feedback input 171. The reference input 172 has a first reference voltage $V_{ref1}$. In some embodiments, a reference signal generator (not shown) may supply the first reference voltage $V_{ref1}$ to the reference input 172 of the error amplifier 168. The error amplifier 168 is configured to generate an error signal EA based on a difference between the first reference voltage $V_{ref1}$ and the feedback signal FB on the feedback input 171. This function defines a voltage-control loop of the current mode DC-DC converter. The error amplifier 168 generates the clamped error signal $EA_{clamp}$ upon the clamped error output 170 by limiting or clamping the error signal EA not to exceed the slope offset signal $V_{SO}$.

Figure 2:
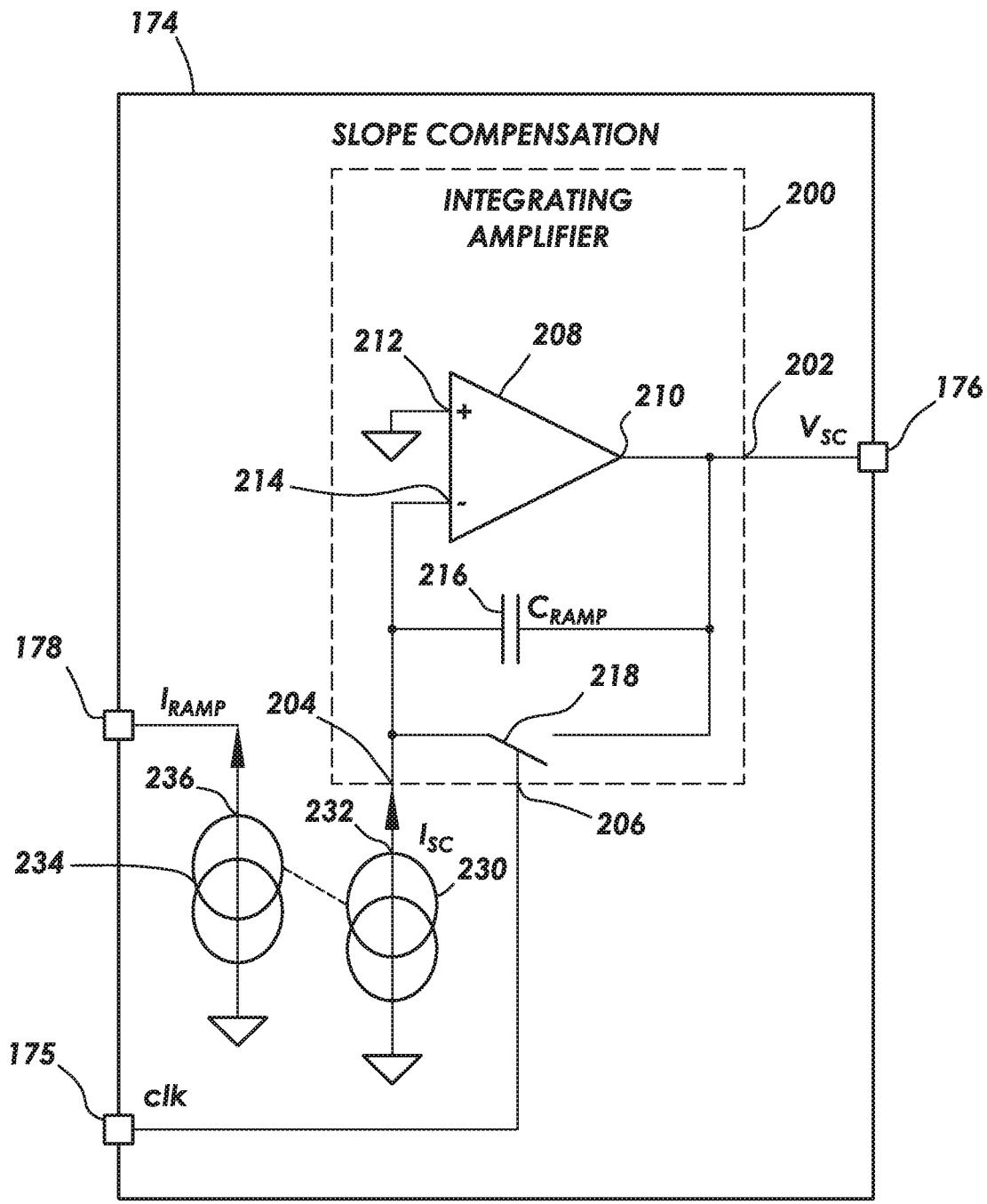
FIG. 2 shows an electrical schematic of a slope compensation circuit in accordance with at least some embodiments.

The current mode DC-DC converter 100 also includes a slope compensation circuit 174 defining a clock input 175, a slope compensation output 176, and a ramp current output 178. The clock input 175 is coupled to the clock output of the oscillator circuit (not shown) for receiving the periodic clock signal clk, which is also provided to the set input 148 of the latch circuit 144. The slope compensation circuit 174 is thereby synchronized with the PWM signal $ON_{bck}$. The slope compensation circuit 174 generates a slope compensation signal $V_{SC}$ upon the slope compensation output 176. The slope compensation circuit 174 also provides a signal current $I_{ramp}$ upon the ramp current output 178, where the signal current $I_{ramp}$ is proportional to a creation current $I_{SC}$ that is used to generate the slope compensation signal $V_{SC}$. FIG. 2 shows an example slope compensation circuit 174 including details regarding generation of the slope compensation signal $V_{SC}$ using the creation current $I_{SC}$.

Figure 7:
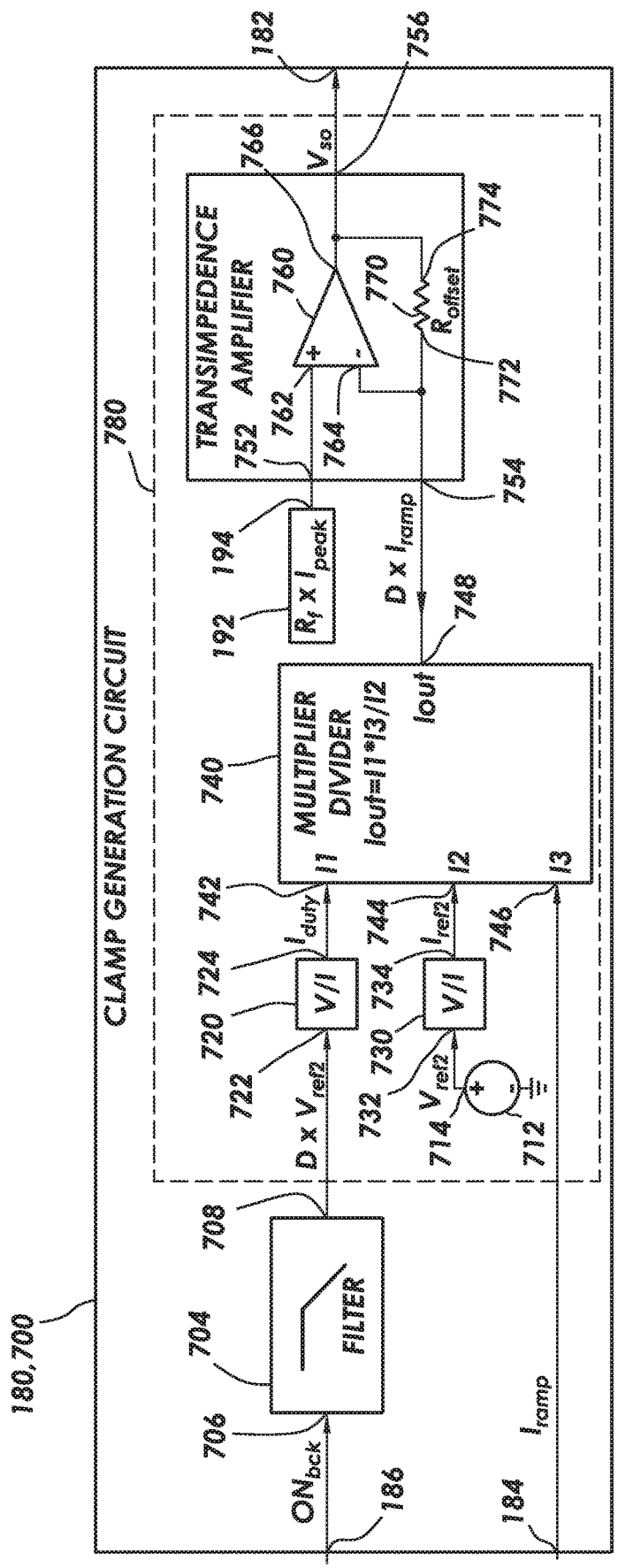
FIG. 7 shows an offset generation circuit in accordance with at least some embodiments.
Figure 8:
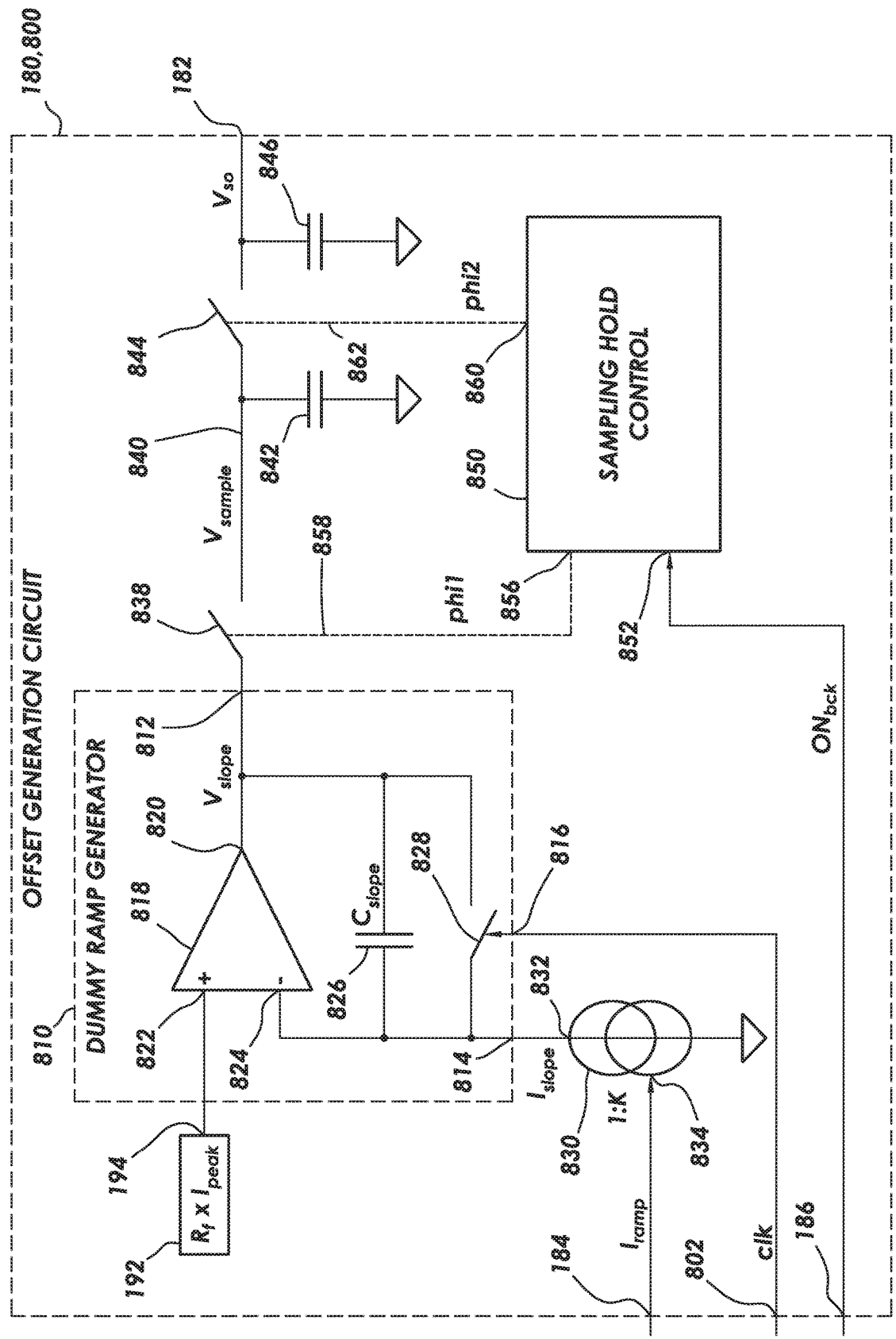
FIG. 8 shows an offset generation circuit in accordance with at least some embodiments.

Still referring to FIG. 1, The current mode DC-DC converter 100 also includes an offset generation circuit 180 defining an offset output 182, and a current input 184, and a signal input 186. The current input 184 is connected to the ramp current output 178 of the slope compensation circuit 174 for receiving the signal current $I_{ramp}$. The signal input 186 is coupled to the latch output 146 of the latch circuit 144 for monitoring the PWM signal $ON_{bck}$. The offset generation circuit 180 is configured to generate the slope offset signal $V_{SO}$ upon the offset output 182 using the signal current $I_{ramp}$ and the PWM signal $ON_{bck}$. FIGS. 7 and 8 show two different example embodiments 700, 800 of the offset generation circuit 180.

Still referring to FIG. 1, the offset generation circuit 180 includes a ramp offset calculation circuit 188 that defines a first input 189, a second input 190, and a ramp offset output 191 having an offset signal $D \times V_{RCA}$. The first input 189 of the ramp offset calculation circuit 188 is coupled to the current input 184 of the offset generation circuit 180 for receiving the signal current $I_{ramp}$. The second input 190 of the ramp offset calculation circuit 188 is coupled to the signal input 186 of the offset generation circuit 180 for receiving the PWM signal $ON_{bck}$. The ramp offset calculation circuit 188 is configured to generate the offset signal $D \times V_{RCA}$ upon the ramp offset output 191 based upon the signal current $I_{ramp}$ and the PWM signal $ON_{bck}$. The offset generation circuit 180 also includes a threshold generator 192 defining a reference terminal 193 and a threshold output terminal 194 having a threshold signal representing a predefined threshold $R_f \times I_{peak}$. In the example embodiment of FIG. 1, the threshold generator 192 is a voltage source with the reference terminal 193 coupled to the ground 123, and with the predefined threshold $R_f \times I_{peak}$ having a constant voltage that is equal to a product of a peak current $I_{peak}$ of the current mode DC-DC converter 100 and the current sense gain resistance $R_f$. The peak current $I_{peak}$ is a setting for a highest value of the input current $I_{IN}$ of the current mode DC-DC converter 100. In some embodiments, the peak current $I_{peak}$ may have a fixed value.

The offset generation circuit 180 also includes a summer 196 defining a first signal input 197, a second signal input 198, and an output terminal 199 coupled to the offset output 182 of the offset generation circuit 180. The first signal input 197 is coupled to the threshold output terminal 194 of the threshold generator 192 for receiving the threshold signal representing the predefined threshold $R_f \times I_{peak}$. The second signal input 198 is coupled to the ramp offset output 191 of the ramp offset calculation circuit 188 for receiving the offset signal $D \times V_{RCA}$. The summer 196 is configured to generate the slope offset signal $V_{SO}$ as a sum of the predefined threshold $R_f \times I_{peak}$ and the offset signal $D \times V_{RCA}$. By using the offset signal $D \times V_{RCA}$ to generate the slope offset signal $V_{SO}$, effects of the slope compensation signal $V_{SC}$ can be taken into account in controlling the current mode DC-DC converter 100, thus, inaccuracies that could otherwise result from the slope compensation signal $V_{SC}$ can be reduced or eliminated.

FIG. 2 shows an electrical schematic of the slope compensation circuit 174 in accordance with at least some embodiments. Specifically, the example slope compensation circuit 174 shown in FIG. 2 includes an integrating amplifier 200 which defines a signal output 202 coupled to the slope compensation output 176 of the slope compensation circuit 174. The integrating amplifier 200 also defines a current input 204 and a reset input 206. The integrating amplifier 200 is configured to generate the slope compensation signal $V_{SC}$ upon the signal output 202 by integrating a creation current $I_{SC}$ over a switching period $T_{sw}$. Specifically, the integrating amplifier 200 includes an operational amplifier 208 having an output terminal 210, a non-inverting input 212, and an inverting input 214. The output terminal 210 of the operational amplifier 208 is coupled to the signal output 202, the non-inverting input 212 is connected to a signal ground, and the inverting input 214 is connected to the current input 204 of the integrating amplifier 200. The integrating amplifier 200 also includes a ramp generation capacitor 216 having a capacitance value $C_{ramp}$ and connected between the current input 204 and the signal output 202. The integrating amplifier 200 also includes a reset switch 218 configured to selectively couple the current input 204 and the signal output 202 in response to assertion of the reset input 206. The reset switch 218 may include one or more FETs or other switching devices.

Figure 3:
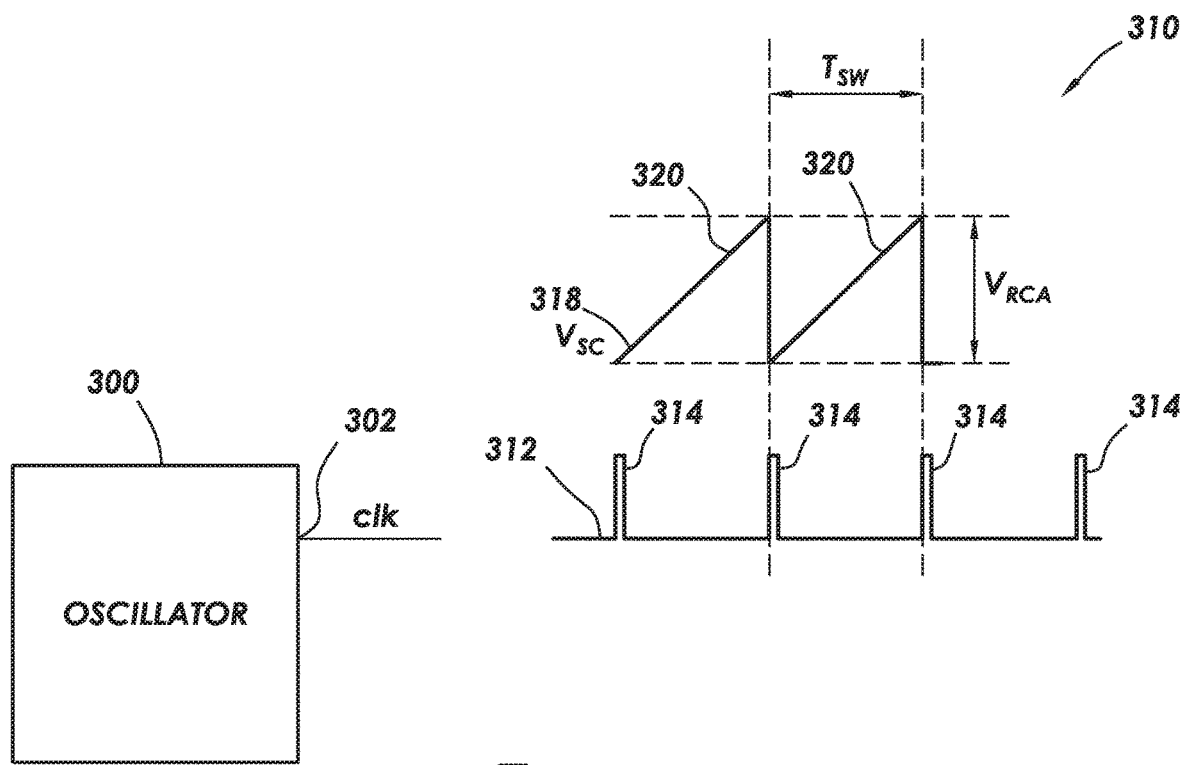
FIG. 3 shows a combined block diagram and timing diagram in accordance with at least some embodiments.

In operation, the ramp generation capacitor 216 is charged at a constant rate by the creation current $I_{SC}$ to generate the slope compensation signal $V_{SC}$ which increases at a constant rate through the switching period $T_{sw}$, as shown in plot 310 of FIG. 3. Assertion of the clock signal clk corresponds to the end of the switching period $T_{sw}$. At that time, the clock signal clk causes the reset switch 218 to short-circuit the ramp generation capacitor 216, thus causing the slope compensation signal $V_{SC}$ to be reset to zero volts. The clock signal clk is asserted for a momentary pulse. When completed (i.e. when the clock signal clk is de-asserted), a subsequent switching period $T_{sw}$ begins, and the slope compensation signal $V_{SC}$ increases again.

Referring again to FIG. 2, the slope compensation circuit 174 also includes a compensation current source 230 which defines a compensation source terminal 232 coupled to the current input 204 of the integrating amplifier 200. The compensation current source 230 is configured to supply the creation current $I_{SC}$, as a direct current (DC) having a constant value, to the current input 204 of the integrating amplifier 200 via the compensation source terminal 232. The slope compensation circuit 174 also includes a ramp current source 234 which defines a ramp source terminal 236 coupled to the ramp current output 178 of the slope compensation circuit 174. The ramp current source 234 is configured to supply the signal current $I_{ramp}$ to the ramp source terminal 236, where the signal current $I_{ramp}$ is proportional to the creation current $I_{SC}$ that is used to generate the slope compensation signal $V_{SC}$. In some embodiments, the signal current $I_{ramp}$ is equal to the creation current $I_{SC}$. For example, the ramp current source 234 may be configured as a current mirror to produce the signal current $I_{ramp}$ at the ramp source terminal 236 which is equal to the creation current $I_{SC}$ at the compensation source terminal 232.

FIG. 3 shows a combined block diagram and timing diagram in accordance with at least some embodiments. Specifically, FIG. 3 shows an oscillator circuit 300 that defines a clock output 302 having the clock signal clk. FIG. 3 also shows a plot 310 including a line 312 of the clock signal clk over time, with pulses 314 at regular intervals and defining the switching periods $T_{sw}$ between consecutive ones of the pulses 314. FIG. 3 also shows a line 318 of the slope compensation signal $V_{SC}$ over time, with the slope compensation signal $V_{SC}$ having a sawtooth waveform with a constant slope 320 over each of the switching periods $T_{sw}$ and defining a peak amplitude $V_{RCA}$ during each of the switching periods $T_{sw}$. Specifically, the peak amplitude $V_{RCA}$ is a difference between a smallest value and a largest value of the slope compensation signal $V_{SC}$ over a corresponding one of the switching periods $T_{sw}$.

Figure 4:
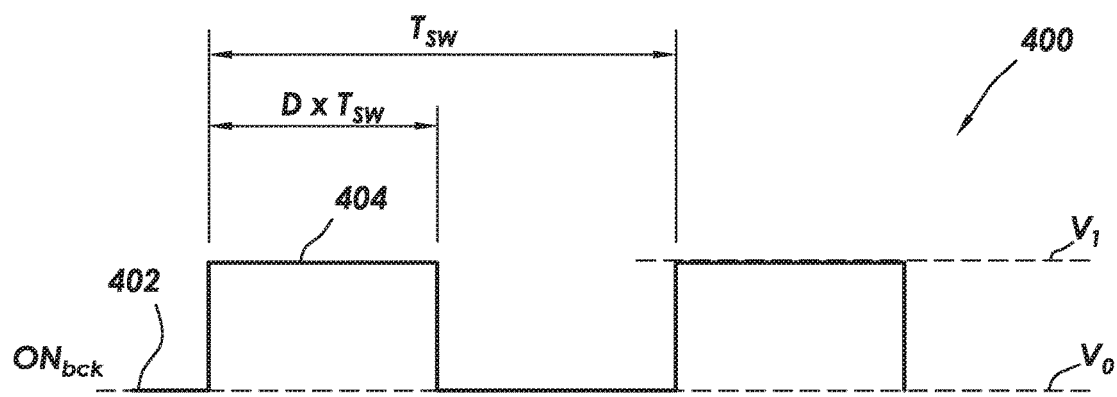
FIG. 4 shows a timing diagram in accordance with at least some embodiments.

FIG. 4 shows a timing diagram in accordance with at least some embodiments. Specifically, FIG. 4 shows a plot 400 with a line 402 representing the PWM signal $ON_{bck}$ over time. The PWM signal $ON_{bck}$ is periodic with the switching periods $T_{sw}$ and includes pulses 404 with the PWM signal $ON_{bck}$ having an asserted voltage $V_1$ for a length of time equal to $D \times T_{sw}$, where D is a duty cycle. Likewise, the PWM signal $ON_{bck}$ has a de-asserted voltage $V_0$ for the remainder of each of the switching periods $T_{sw}$. The duty cycle D is, therefore, a fraction or a number between zero and one that specifies how much of corresponding ones of the switching periods $T_{sw}$ that the PWM signal $ON_{bck}$ is asserted.

Figure 5:
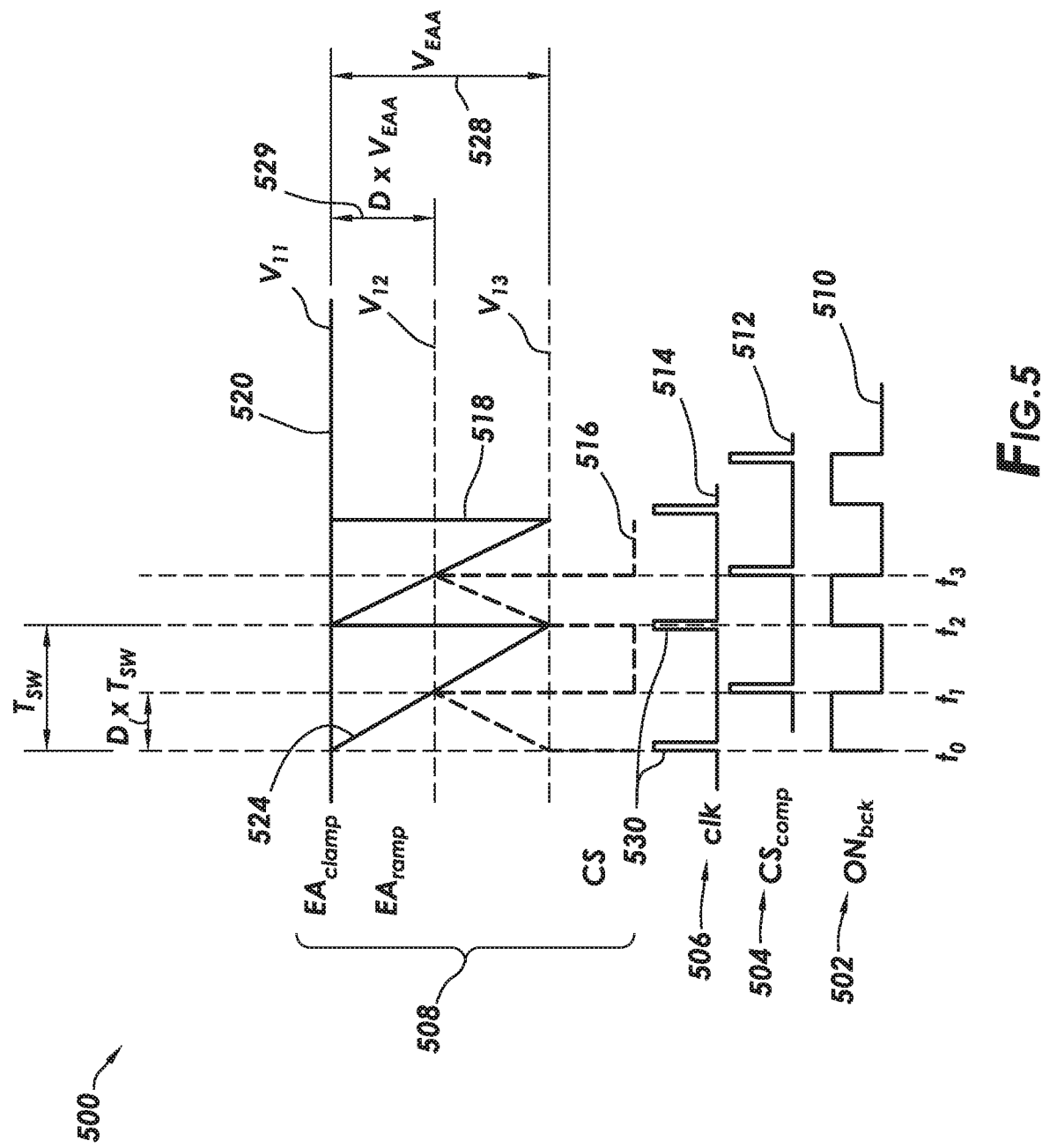
FIG. 5 shows a timing diagram in accordance with at least some embodiments.

FIG. 5 shows a timing diagram 500 in accordance with at least some embodiments. Specifically, the timing diagram 500 shows plot 502, plot 504, plot 506, and plot 508, all plotted on corresponding time axes. Plot 502 includes line 510 showing the PWM signal $ON_{bck}$. Plot 504 includes line 512 showing the comparison signal $CS_{comp}$. Plot 506 includes line 514 showing the clock signal clk. Plot 508 includes line 516, line 518, and line 520, all having a shared voltage scale. Line 516 shows values of the sensed current signal CS over time. Line 518 shows values of the ramped error signal $EA_{ramp}$ over time. Line 518 includes a downward slope 524 from the slope compensation signal $V_{SC}$ over each of the switching periods $T_{sw}$. In some embodiments, the downward slope 524 is constant during each of the switching periods $T_{sw}$. This downward slope 524 results from how the slope compensation signal $V_{SC}$ is created (as shown, for example, in FIG. 2). In some embodiments, the downward slope 524 is equal to the current sense gain resistance $R_f$ multiplied by a negative of the output voltage $V_{OUT}$ divided by an inductance L of the inductor 104.

In operating the current mode DC-DC converter 100, and as shown on FIG. 5, the clock signal clk defines a momentary pulse 530 at time t0. At that time t0, the PWM signal $ON_{bck}$ is asserted and current flows from the input voltage $V_{IN}$ (i.e. from the input terminal 102) to the inductor 104, which causes the sensed current signal CS to rise. Though not specifically shown in FIG. 5, the momentary pulse 530 of the clock signal clk at time t0 also causes the slope compensation circuit 174 to increase the slope compensation signal $V_{SC}$, as described by way of example in FIGS. 2-3. The ramped error signal $EA_{ramp}$ decreases over time as a result of subtracting the slope compensation signal $V_{SC}$ from the clamped error signal $EA_{clamp}$. At time $t_1$, the sensed current signal CS first exceeds the ramped error signal $EA_{ramp}$, which is detected by the comparator 150, resulting in the PWM signal $ON_{bck}$ being de-asserted and inhibiting current flow from the input voltage $V_{IN}$ (i.e. from the input terminal 102) to the inductor 104. At that time $t_1$, the sensed current signal CS drops to zero. The process repeats itself with a subsequent momentary pulse 530 of the clock signal clk at time t2. The time difference between a given momentary pulse 530 of the clock signal clk and a next consecutive momentary pulse 530 of the clock signal clk defines the switching period $T_{sw}$. The time difference between a given momentary pulse 530 of the clock signal clk, (e.g. time t0), and the time that the sensed current signal CS first exceeds the ramped error signal $EA_{ramp}$ (e.g. time $t_1$) is equal to D multiplied by $T_{sw}$, where D is the duty cycle of the PWM signal $ON_{bck}$, and $T_{sw}$ is the switching period.

Still referring to FIG. 5, plot 508 also shows a first signal level $V_{11}$ equal to the clamped error signal $EA_{clamp}$, a second signal level $V_{12}$ lower than the first signal level $V_{11}$, and a third signal level $V_{13}$ lower than the second signal level $V_{12}$. The ramped error signal $EA_{ramp}$ has a peak amplitude $V_{EAA}$ over the switching period $T_{sw}$, which is equivalent to a first signal differential 528 between the highest value of the ramped error signal $EA_{ramp}$ during the switching period $T_{sw}$ (i.e. the first signal level $V_{11}$) and the lowest value of the ramped error signal $EA_{ramp}$ during the switching period $T_{sw}$ (i.e. the third signal level $V_{13}$), immediately before the end of the switching period $T_{sw}$ at time $t_3$. Because the ramped error signal $EA_{ramp}$ is the result of a sum or a difference of the slope compensation signal $V_{SC}$ and the clamped error signal $EA_{clamp}$, the peak amplitude $V_{EAA}$ of the ramped error signal $EA_{ramp}$ is equal to the peak amplitude $V_{RCA}$ of the slope compensation signal $V_{SC}$, at least over periods of time while the clamped error signal $EA_{clamp}$ remains constant. In some embodiments, this may provide a method of determining the peak amplitude $V_{EAA}$ of either of the ramped error signal $EA_{ramp}$ or the peak amplitude $V_{RCA}$ of the slope compensation signal $V_{SC}$ by using the other one of the ramped error signal $EA_{ramp}$ or the slope compensation signal $V_{SC}$.

Plot 508 also shows a second signal differential 529 as a difference between the first signal level $V_{11}$ of the clamped error signal $EA_{clamp}$ and the second signal level $V_{12}$, where the sensed current signal CS first exceeds the ramped error signal $EA_{ramp}$ in a given one of the switching periods $T_{sw}$. The second signal differential 529 is equal to the duty cycle D multiplied by the peak amplitude $V_{EAA}$ of the ramped error signal $EA_{ramp}$.

Figure 6:
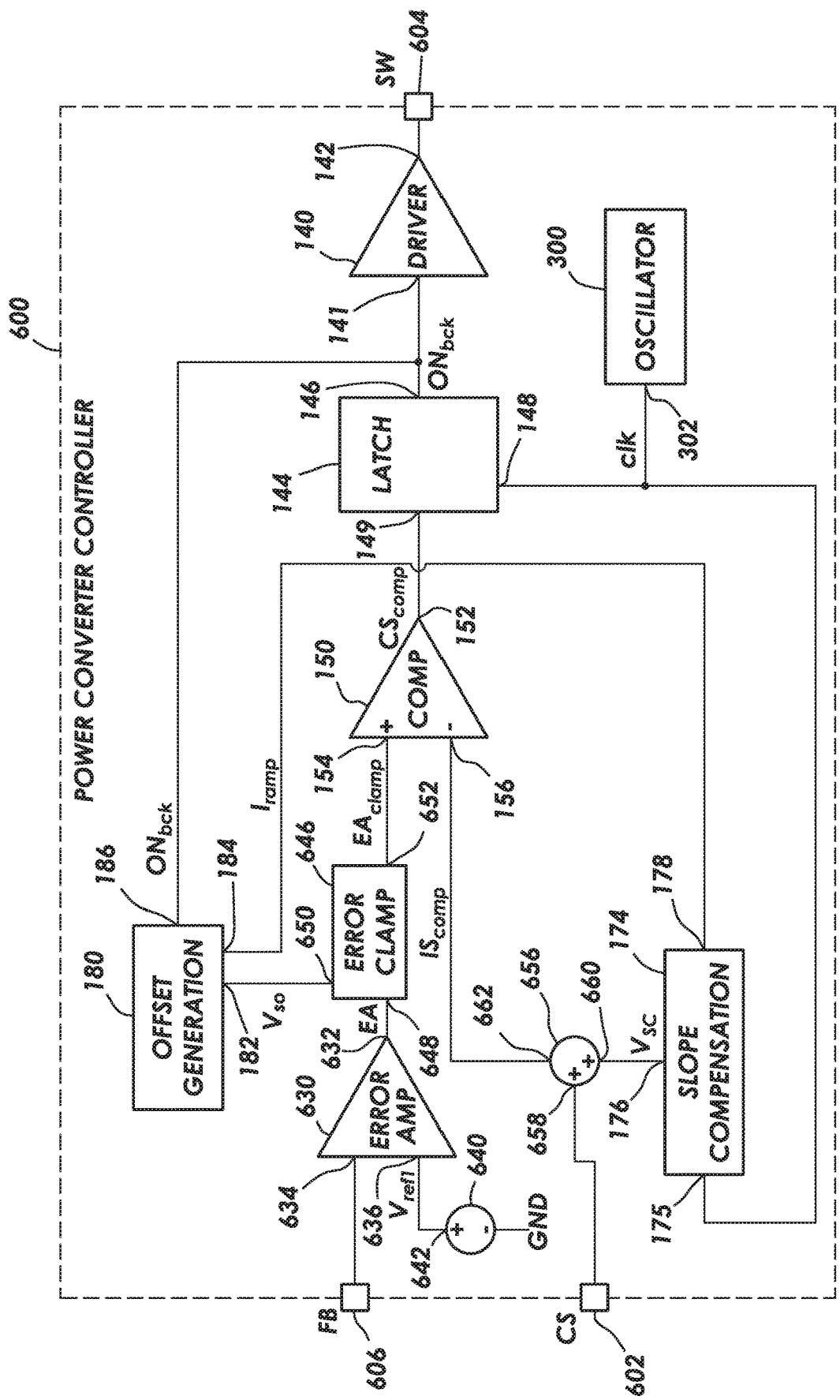
FIG. 6 shows a controller for a power converter in accordance with at least some embodiments.

FIG. 6 shows an example controller 600 for a power converter in accordance with at least some embodiments. The example controller 600 of FIG. 6 is similar to much of FIG. 1 and includes many of the same components. However, the example controller 600 of FIG. 6 includes some differences from the current mode DC-DC converter 100 shown in FIG. 1. For example, the slope compensation signal $V_{SC}$ is added to the sensed current signal CS in the example controller 600 of FIG. 6, wherein the slope compensation signal $V_{SC}$ is subtracted from the clamped error signal $EA_{clamp}$ in the current mode DC-DC converter 100 of FIG. 1. In some embodiments, the example controller 600 may take the form of a packaged integrated circuit, such as a single integrated circuit encapsulated in a packaging material with various terminals electrically exposed through the packaging material. As shown in FIG. 6, the example controller 600 defines a current sense terminal 602 configured to receive a sensed current signal CS representing a current supplied to an inductor in a DC-DC converter using the example 600. The example controller 600 also defines a switch control terminal 604 for controlling a switch, such as a power FET in a power converter. The example controller 600 also defines a feedback terminal 606 for receiving a feedback signal FB.

Specifically, the example controller 600 of FIG. 6 includes an oscillator circuit 300 that defines a clock output 302 having a clock signal clk. The oscillator circuit 300 within the example controller 600 may be similar or identical to the oscillator circuit 300 shown in FIG. 3. The example controller 600 also includes a gate driver 140 defining an input 141 and a driver output 142 connected to the switch control terminal 604. The gate driver 140 is configured to energize the driver output 142 in response to assertion of the input 141.

The example controller 600 also includes a latch circuit 144 defining a latch output 146 coupled to the input 141 of the gate driver 140. The latch circuit 144 also defines a set input 148 and a reset input 149. The latch circuit 144 is configured to drive and hold the latch output 146 in an asserted condition (i.e. to latch) in response to the set input 148 being asserted. The latch circuit 144 is also configured to de-assert the latch output 146 (i.e. to unlatch) in response to the reset input 149 being asserted. In at least some embodiments, the latch circuit 144 includes a set-reset (SR) circuit, but other arrangements may be used (e.g. a JK flip-flop). The set input 148 is coupled to the clock output 302 of the oscillator circuit 300 for receiving the clock signal clk. The latch circuit 144, thus generates a PWM signal $ON_{bck}$ upon the latch output 146 and which varies with a timing of the reset input 149.

The example controller 600 also includes also includes a comparator 150 defining a comparison output 152 connected to the reset input 149 of the latch circuit 144. The comparator 150 also defines a non-inverting input 154 and an inverting input 156. The comparator 150 is configured generate a comparison signal $CS_{comp}$ upon the comparison output 152 by asserting the comparison output 152 in response to a clamped error signal $EA_{clamp}$ upon the non-inverting input 154 exceeding a ramped sensed current signal $IS_{comp}$ upon the inverting input 156. The comparison signal $CS_{comp}$ causes the latch output 146 of the latch circuit 144 to be de-asserted, thus de-energizing the switch control terminal 604.

The example controller 600 also includes a slope compensation circuit 174 defining a clock input 175 and a slope compensation output 176 and a ramp current output 178. The clock input 175 is coupled to the clock output 302 of the oscillator circuit 300 for receiving the clock signal clk. The slope compensation circuit 174 is thereby synchronized with the PWM signal $ON_{bck}$. The slope compensation circuit 174 generates a slope compensation signal $V_{SC}$ upon the slope compensation output 176. The slope compensation circuit 174 also provides a signal current $I_{ramp}$ upon the ramp current output 178, where the signal current $I_{ramp}$ is proportional to a creation current $I_{SC}$ that is used to generate the slope compensation signal $V_{SC}$. FIG. 2 shows an example slope compensation circuit 174, including details regarding generation of the slope compensation signal $V_{SC}$ using the creation current $I_{SC}$.

Still referring to FIG. 6, the example controller 600 also includes an error amplifier 630 that defines an error output terminal 632 having an error signal EA. The error amplifier 630 also defines a feedback input 634 and a reference input 636 having a first reference voltage $V_{ref1}$. The feedback input 634 of the error amplifier 630 is coupled to the feedback terminal 606 of the controller 600 for monitoring the feedback signal FB. The error amplifier 630 is configured to generate the error signal EA upon the error output terminal 632 based on a difference between the first reference voltage $V_{ref1}$ and the feedback signal FB from the feedback terminal 606. This function defines a voltage-control loop of the current mode DC-DC converter. A reference generator 640 defines a reference output 642 coupled to the reference input 636 for supplying the first reference voltage $V_{ref1}$ to the error amplifier 630.

The example controller 600 also includes an offset generation circuit 180 defining an offset output 182, and a current input 184, and a signal input 186. The current input 184 is connected to the ramp current output 178 of the slope compensation circuit 174 for receiving the signal current $I_{ramp}$. The signal input 186 is coupled to the latch output 146 of the latch circuit 144 for monitoring the PWM signal $ON_{bck}$. The offset generation circuit 180 is configured to generate the slope offset signal $V_{SO}$ upon the offset output 182 using the signal current $I_{ramp}$ and the PWM signal $ON_{bck}$.

An error clamp circuit 646 defines an error input 648, and a clamp input 650, and a clamped error output 652. The error input 648 is coupled to the error output terminal of the error amplifier 630 for receiving the error signal EA therefrom. The clamp input 650 is coupled to the offset output 182 of the offset generation circuit 180 for receiving the slope offset signal $V_{SO}$ therefrom. The clamped error output 652 is coupled to the non-inverting input 154 of the comparator 150 for providing a clamped error signal $EA_{clamp}$ thereto. The error clamp circuit 646 generates the clamped error signal $EA_{clamp}$ upon the clamped error output 652 by limiting or clamping the error signal EA not to exceed the slope offset signal $V_{SO}$.

Still referring to FIG. 6, the example controller 600 also includes a summer 656 that defines a first input 658 and a second input 660 and a summer output 662 connected to the inverting input 156 of the comparator 150 for providing the ramped sensed current signal $IS_{comp}$ thereto. The first input 658 of the summer 656 is connected to current sense terminal 602 of the controller 600 for receiving the sensed current signal CS therefrom. The second input 660 of the summer 656 is connected to the slope compensation output 176 of the slope compensation circuit 174 for receiving the slope compensation signal $V_{SC}$ therefrom. The summer 656 generates the ramped sensed current signal $IS_{comp}$ upon the summer output 662 by summing or adding the sensed current signal CS from the first input 658 to the slope compensation signal $V_{SC}$ from the second input 660.

FIG. 7 shows a first example embodiment 700 of the offset generation circuit 180 in accordance with at least some embodiments. Specifically, the offset generation circuit 180 includes a filter 704 that defines an input 706 and an output 708. The input 706 is coupled to the signal input 186 of the offset generation circuit 180 for monitoring the PWM signal $ON_{bck}$. The filter 704 is configured to generate a duty signal $D \times V_{ref2}$ upon the output 708, with the duty signal $D \times V_{ref2}$ indicative of the duty cycle D of the PWM signal $ON_{bck}$. More specifically, the duty signal $D \times V_{ref2}$ is equal to the duty cycle D of the PWM signal $ON_{bck}$ times a second reference voltage $V_{ref2}$. For example, when the duty cycle D has a value of 0.5, the output 708 of the filter 704 has a voltage of $0.5 \times V_{ref2}$. A reference generator 712 defines a reference output 714 having the second reference voltage $V_{ref2}$. In some embodiments, the reference generator 712 takes the form of a voltage source that is configured to provide the second reference voltage $V_{ref2}$ to match a scale factor of the duty signal $D \times V_{ref2}$.

Still referring to FIG. 7, the offset generation circuit 180 also includes a first voltage-to-current converter 720 that defines a voltage input 722 and a current output 724. The voltage input 722 is coupled to the output 708 of the filter 704 for receiving a duty signal $D \times V_{ref2}$ in the form of a voltage. The first voltage-to-current converter 720 is configured to generate a first current signal $I_{duty}$ upon the current output 724 corresponding to the duty signal $D \times V_{ref2}$ upon the voltage input 722. The offset generation circuit 180 also includes a second voltage-to-current converter 730 that defines a voltage input 732 and a current output 734. The voltage input 732 is coupled to the reference output 714 of the reference generator 712 for receiving second reference voltage $V_{ref2}$ therefrom. The second voltage-to-current converter 730 is configured to generate a second current signal $I_{ref2}$ upon the current output 734 corresponding to the second reference voltage $V_{ref2}$ upon the voltage input 732.

The first example embodiment 700 of the offset generation circuit 180 also includes a multiplier/divider circuit 740 that defines a first current input 742, a second current input 744, a third current input 746, and a current signal output 748. In some embodiments, the multiplier/divider circuit 740 is an analog circuit. More specifically, the multiplier/divider circuit 740 may comprise one or more translinear cells that may include bipolar-based devices. The first current input 742 is coupled to the current output 724 of the first voltage-to-current converter 720 for receiving the first current signal $I_{duty}$ therefrom. The second current input 744 is coupled to the current output 734 of the second voltage-to-current converter 730 for receiving the second current signal $I_{ref2}$ therefrom. The third current input 746 is coupled to the current input 184 of the offset generation circuit 180 for receiving the signal current $I_{ramp}$ therefrom. The multiplier/divider circuit 740 is configured to generate an intermediate signal $D \times I_{ramp}$ at the current signal output 748 by multiplying the first current signal $I_{duty}$ on the first current input 742 by the signal current $I_{ramp}$ on the third current input 746, and dividing by the second current signal $I_{ref2}$ on the second current input 744.

The first example embodiment 700 of the offset generation circuit 180 also includes a transimpedance amplifier 750 defining a first signal input 752, a second signal input 754, and an output terminal 756. The first signal input 752 is coupled to the threshold output terminal 194 of the threshold generator 192 for receiving the threshold signal representing the predefined threshold $R_f \times I_{peak}$. In some embodiments, the threshold signal representing the predefined threshold $R_f \times I_{peak}$ is in the form of a voltage signal. The second signal input 754 of the transimpedance amplifier 750 is coupled to the current signal output 748 of the multiplier/divider circuit 740 for receiving the intermediate signal $D \times I_{ramp}$, in the form of a current, therefrom. The output terminal 756 of the transimpedance amplifier 750 is coupled to the offset output 182 for providing the slope offset signal $V_{SO}$ thereupon. The transimpedance amplifier 750 is configured to generate the slope offset signal $V_{SO}$ upon the output terminal 756 by scaling, shifting, and converting the intermediate signal $D \times I_{ramp}$ from a current signal to a voltage. More specifically, and as shown in FIG. 7, the transimpedance amplifier 750 includes an operational amplifier 760 defining a non-inverting input 762, an inverting input 764, and a signal output 766. The non-inverting input 762 is coupled to the first signal input 752; the inverting input 764 is coupled to the second signal input 754; and the signal output 766 is coupled to the output terminal 756 of the transimpedance amplifier 750. An offset resistor 770 includes a first lead 772 coupled to the second signal input 754 and a second lead 774 coupled to the signal output 766. In some embodiments, the offset resistor 770 has a resistance value equal to the switching period $T_{sw}$ divided by the capacitance value $C_{ramp}$ of the ramp generation capacitor 216 used to generate the slope compensation signal $V_{SC}$. In some embodiments, and particularly where the signal current $I_{ramp}$ is equal to the creation current $I_{SC}$, the peak amplitude $V_{RCA}$ of the slope compensation signal $V_{SC}$ can be determined as the signal current $I_{ramp}$ multiplied by the switching period $T_{sw}$ and divided by the capacitance value $C_{ramp}$ of the ramp generation capacitor 216. By providing the offset resistor 770 with the resistance value equal to the switching period $T_{sw}$ divided by the capacitance value $C_{ramp}$ of the ramp generation capacitor 216, the intermediate signal $D \times I_{ramp}$ causes a voltage drop across the offset resistor 770 equal to the duty cycle D multiplied by the peak amplitude $V_{RCA}$ of the slope compensation signal $V_{SC}$.

The operational amplifier 760 of the transimpedance amplifier 750 adds the voltage drop across the offset resistor 770 with the predefined threshold $R_f \times I_{peak}$ on the non-inverting input 762, providing a summed signal upon the signal output 766. Thus, the operational amplifier 760 generates the slope offset signal $V_{SO}$ as $R_f \times I_{peak} + D \times V_{RCA}$.

The transimpedance amplifier 750, thus operates in conjunction with the multiplier/divider circuit 740 to form a signal generator 780 that is configured to generate the slope offset signal $V_{SO}$ using the duty cycle D and the creation current $I_{SC}$. More specifically, the signal generator 780 uses the duty signal $D \times V_{ref2}$ (which is indicative of the duty cycle D), and the signal current $I_{ramp}$ (which is based upon the creation current $I_{SC}$) to generate the slope offset signal $V_{SO}$.

FIG. 8 shows a second example embodiment 800 of the offset generation circuit 180 in accordance with at least some embodiments. In addition to the offset output 182, the current input 184, and the signal input 186, shown in the example circuit of FIG. 1, the second example embodiment 800 of the offset generation circuit 180 also includes a clock input 802 for receiving the clock signal clk from the oscillator circuit 300. The offset generation circuit 180 includes a dummy ramp generator 810 configured to generate a slope signal $V_{slope}$ having a dummy ramp slope 917 (FIG. 9) as a change in voltage over time which is equal to the constant slope 320 of the slope compensation signal $V_{SC}$ (FIG. 3). In some embodiments, and as shown in FIG. 8, the dummy ramp generator 810 is configured as an integrating amplifier that is similar in design and function to the integrating amplifier 200 used to create the slope compensation signal $V_{SC}$ in the slope compensation circuit 174 (FIG. 2).

Specifically, dummy ramp generator 810 defines a signal output 812, a current input 814, and a reset input 816. The dummy ramp generator 810 is configured to generate the slope signal $V_{slope}$ upon the signal output 812 by integrating a slope generation current $I_{slope}$ over a switching period $T_{sw}$. The dummy ramp generator 810 includes an operational amplifier 818 having an output terminal 820, a non-inverting input 822, and an inverting input 824. The output terminal 820 of the operational amplifier 818 is coupled to the signal output 812; the non-inverting input 822 is coupled to the threshold output terminal 194 of the threshold generator 192 for receiving the threshold signal representing the predefined threshold $R_f \times I_{peak}$, and the inverting input 824 is connected to the current input 814 of the dummy ramp generator 810. The dummy ramp generator 810 also includes a slope generation capacitor 826 connected between the current input 814 and the signal output 812 and having a capacitance value $C_{slope}$. The dummy ramp generator 810 also includes a reset switch 828 configured to selectively couple the current input 814 and the signal output 812 in response to assertion of the reset input 816. The reset switch 218 may include one or more FETs or other switching devices.

In operation, the slope generation capacitor 826 is charged at a constant rate by the slope generation current $I_{slope}$ generate the slope signal $V_{slope}$ which increases at a constant rate through the switching period $T_{sw}$. Assertion of the clock signal clk corresponds to the end of the switching period $T_{sw}$. At that time, the clock signal clk causes the reset switch 828 to short-circuit the slope generation capacitor 826, thus causing the slope signal $V_{slope}$ to be reset to zero volts. The clock signal clk is asserted for a momentary pulse. When completed (i.e. when the clock signal clk is de-asserted), a subsequent switching period $T_{sw}$ begins, and the slope signal $V_{slope}$ increases again.

Still referring to FIG. 8, the offset generation circuit 180 also includes a dummy current source 830 which defines a compensation source terminal 832 and a current reference terminal 834 coupled to the current input 184 of the offset generation circuit 180 to receive the signal current $I_{ramp}$. The compensation source terminal 832 is coupled to the current input 814 of the dummy ramp generator 810. The dummy current source 830 is configured to generate the slope generation current $I_{slope}$ as a constant current that is proportional to the signal current $I_{ramp}$. Thus, the slope generation current $I_{slope}$ is also a predefined multiple of the creation current $I_{SC}$. In some embodiments, the slope generation current $I_{scope}$ is equal to the signal current $I_{ramp}$ and/or the creation current $I_{SC}$. The dummy current source 830 provides the slope generation current $I_{slope}$ the current input 814 of the dummy ramp generator 810 via the compensation source terminal 832.

The second example embodiment 800 of the offset generation circuit 180 includes a sampling switch 838 configured to selectively couple the signal output 812 of the dummy ramp generator 810 with a sampling node 840 in response to a sampling signal phi1 to selectively energize the sampling node 840 with the slope signal $V_{slope}$. The sampling switch 838 may include one or more FETs or other switching devices. The offset generation circuit 180 also includes a first holding capacitor 842 connected between the sampling node 840 and a signal ground for maintaining the sampling node 840 at a constant voltage while the sampling switch 838 is in a non-conductive condition. The sampling switch 838 and the first holding capacitor 842 thus operate in combination to generate a dummy ramp signal $V_{sample}$ upon the sampling node 840.

The second example embodiment 800 of the offset generation circuit 180 also includes a holding switch 844 configured to selectively couple the sampling node 840 with the offset output 182 of the offset generation circuit 180 in response to a holding signal phi2 to selectively energize the offset output 182 with the dummy ramp signal $V_{sample}$. The holding switch 844 may include one or more FETs or other switching devices. The offset generation circuit 180 also includes a second holding capacitor 846 connected between the offset output 182 and a signal ground for maintaining the offset output 182 at a constant voltage while the holding switch 844 is in a non-conductive condition. The holding switch 844 and the first holding capacitor 842 thus operate in combination to generate the slope offset signal $V_{SO}$ upon the offset output 182.

The second example embodiment 800 of the offset generation circuit 180 also includes a sampling hold control circuit 850 defining a PWM input 852 coupled to the signal input 186 of the offset generation circuit 180 for monitoring the PWM signal $ON_{bck}$. The sampling hold control circuit 850 also defines a first control output 856 coupled to the sampling switch 838 via a first control line 858 and configured to provide the sampling signal phi1 to drive the sampling switch 838 to the conductive condition by asserting the sampling signal phi1. The sampling hold control circuit 850 also defines a second control output 860 coupled to the holding switch 844 via a second control line 862 and configured to provide the holding signal phi2 to drive the holding switch 844 to the conductive condition by asserting the holding signal phi2.

Figure 9:
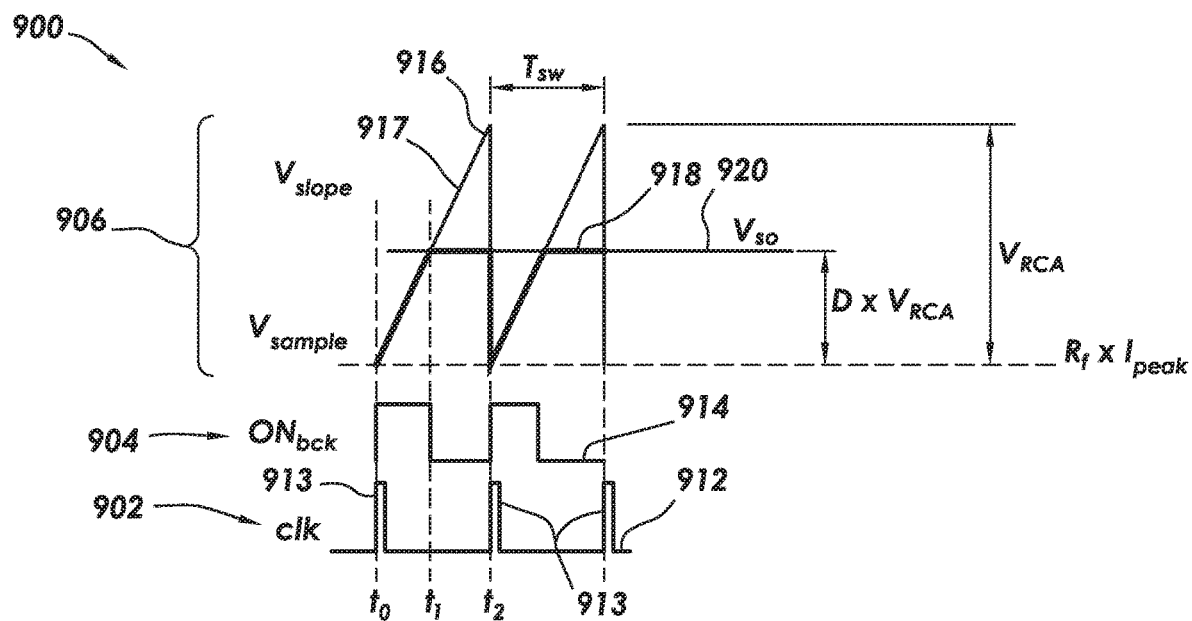
FIG. 9 shows a timing diagram in accordance with at least some embodiments.

FIG. 9 shows a timing diagram 900 in accordance with at least some embodiments. The timing diagram 900 of FIG. 9 includes plot 902, plot 904, and plot 906, plotted on corresponding time axes. Plot 902 includes line 912 showing the clock signal clk defining momentary pulses 913 at regular intervals equal to the switching period $T_{sw}$. Plot 904 includes line 914 showing the PWM signal $ON_{bck}$. Plot 906 includes line 916 showing the slope signal $V_{slope}$, line 918 showing the dummy ramp signal $V_{sample}$, and line 920 showing the slope offset signal $V_{SO}$. Specifically, FIG. 9 shows the slope signal $V_{slope}$ with a sawtooth waveform with a period equal to the switching period $T_{sw}$, similar to the slope compensation signal $V_{SC}$ shown at line 318 of FIG. 3. The slope signal $V_{slope}$ increases from the predefined threshold $R_f \times I_{peak}$ with a dummy ramp slope 917 that remains constant over the switching periods $T_{sw}$, defining a peak amplitude $V_{RCA}$ during each of the switching periods $T_{sw}$.

FIG. 9 also shows the dummy ramp signal $V_{sample}$ increasing with the slope signal $V_{slope}$ while the PWM signal $ON_{bck}$ is asserted (e.g. between times $t_0$ and $t_1$) and remaining constant at a value equal to the predefined threshold $R_f \times I_{peak}$ plus the offset signal $D \times V_{RCA}$ while the PWM signal $ON_{bck}$ is de-asserted (e.g. between times $t_1$ and t2). That value equal to the predefined threshold $R_f \times I_{peak}$ plus the offset signal $D \times V_{RCA}$ is sampled and held by the second example embodiment 800 of the offset generation circuit 180 to define the slope offset signal $V_{SO}$ shown on line 920. The dummy ramp signal $V_{sample}$ shown on line 918 is a result of the sampling switch 838 being in the conducting condition while the PWM signal $ON_{bck}$ is asserted and being in the non-conducting condition while the PWM signal $ON_{bck}$ is de-asserted. FIG. 9 also shows the slope offset signal $V_{SO}$ remaining constant throughout the switching period $T_{sw}$. The slope offset signal $V_{SO}$ shown on line 920 is a result of the holding switch 844 being in the conducting condition only after the PWM signal $ON_{bck}$ is de-asserted and being in the non-conducting condition, preventing the slope offset signal $V_{SO}$ from changing, while the PWM signal $ON_{bck}$ is asserted.

Figure 10:
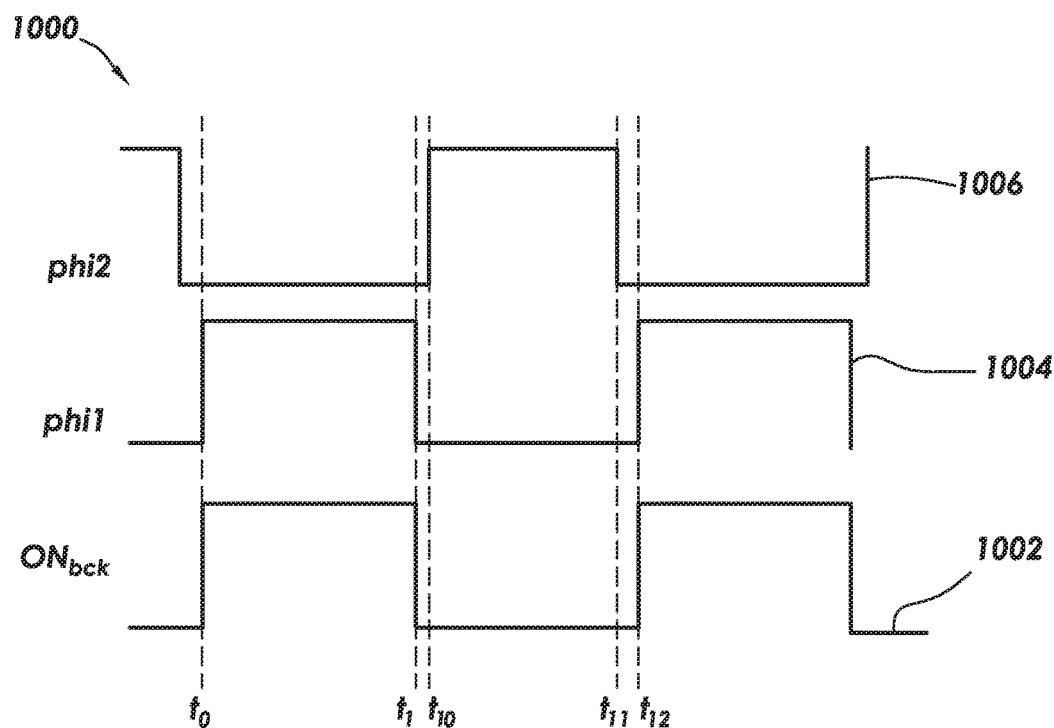
FIG. 10 shows a timing diagram in accordance with at least some embodiments.

FIG. 10 shows a timing diagram in accordance with at least some embodiments. Specifically, FIG. 10 shows a plot 1000 including line 1002 showing the PWM signal $ON_{bck}$, line 1004 showing the sampling signal phi1, and line 1006 showing the holding signal phi2, plotted on corresponding time axes. At time t0, both of the PWM signal $ON_{bck}$ and the sampling signal phi1 transition from a de-asserted condition to an asserted condition. At time $t_1$, both of the PWM signal $ON_{bck}$ and the sampling signal phi1 transition back from the asserted condition to the de-asserted condition. At time $t_{10}$, shortly after time $t_1$, the holding signal phi2 transitions from a de-asserted condition to an asserted condition. The holding signal phi2 remains in the asserted condition until time $t_{11}$. At time t2, which is shortly after time $t_{11}$, the process repeats, with both of the PWM signal $ON_{bck}$ and the sampling signal phi1 transitioning from the de-asserted condition to the asserted condition.

Figure 11:
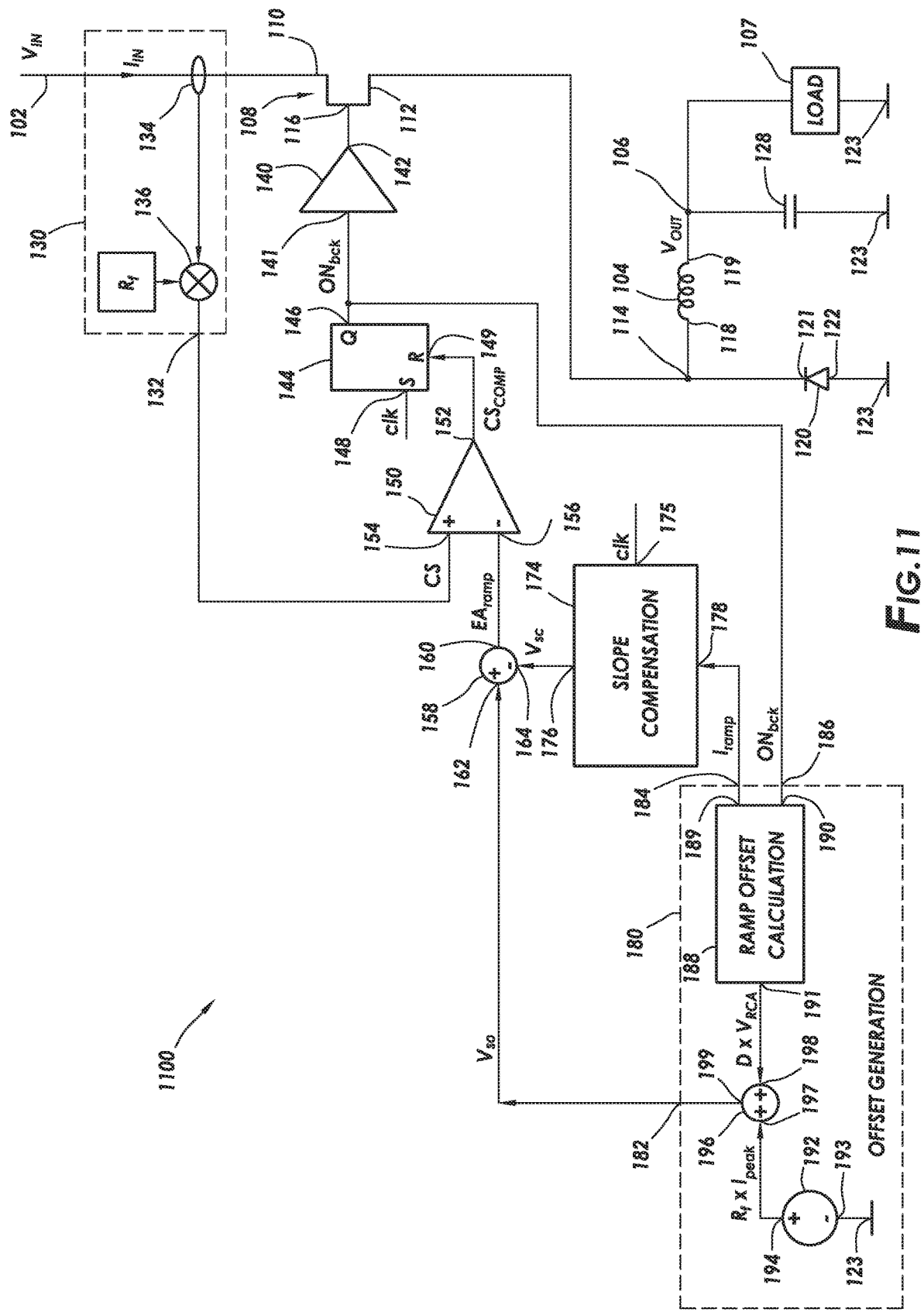
FIG. 11 shows a combination electrical schematic and block diagram of a current-controlled DC-DC converter in accordance with at least some embodiments.

FIG. 11 shows a combination electrical schematic and block diagram of a current-controlled DC-DC converter 1100 in accordance with at least some embodiments. The current-controlled DC-DC converter 1100 of FIG. 11 is similar in construction and operation to the DC-DC converter 100 of FIG. 1, except it does not include an error amplifier 168 or associated feedback signal FB. Instead, the current-controlled DC-DC converter 1100 shown in FIG. 11 is only controlled by a current loop.

Specifically, the current-controlled DC-DC converter 1100 shown in FIG. 11 includes a first summer 158 defining a first input 162, which is similar to the first summer 158 in the DC-DC converter 100 of FIG. 1, except the first input 162 is coupled directly to the offset output 182 of the offset generation circuit 180 for receiving the slope offset signal $V_{SO}$ therefrom. Thus, the ramped error signal $EA_{ramp}$ generated by the first summer 158 and supplied to the non-inverting input 154 of the comparator 150 is based on a difference between the slope offset signal $V_{SO}$ minus the ramped error signal $EA_{ramp}$.

Figure 12:
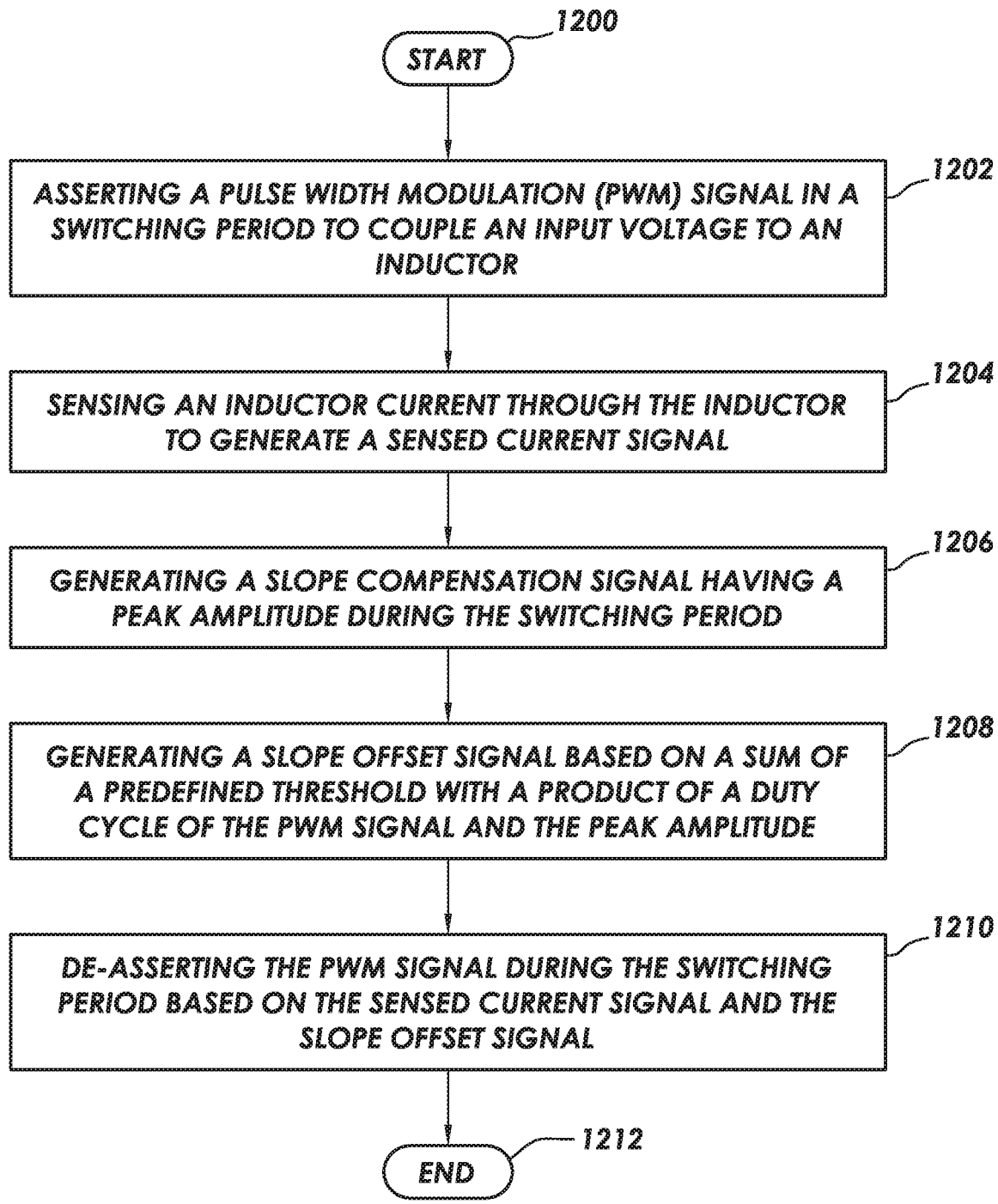
FIG. 12 shows method steps in accordance with at least some embodiments.

FIG. 12 shows a method of operating a DC-DC converter in accordance with at least some embodiments. In particular, the method starts (block 1200) and comprises: asserting a pulse width modulation (PWM) signal in a switching period to couple an input voltage to an inductor (block 1202). The method also includes sensing an inductor current through the inductor to generate a sensed current signal (block 1204). The method also includes generating a slope compensation signal having a peak amplitude during the switching period (block 1206). The method also includes generating a slope offset signal based on a sum of a predefined threshold with a product of a duty cycle of the PWM signal and the peak amplitude (block 1208). The method concludes by de-asserting the PWM signal during the switching period based on the sensed current signal and the slope offset signal (block 1210). Thereafter the method ends (block 1212).

In some embodiments, the step of generating the slope offset signal further comprises: averaging the PWM signal over time to determine the duty cycle from the PWM signal; and using the duty cycle and the creation current to generate the slope offset signal. These functions may be performed, for example, by an offset generation circuit such as the example circuit shown in FIG. 7.

In some embodiments, the step of generating the slope offset signal further comprises: generating a dummy ramp signal independent from the slope compensation signal by: generating a slope current proportional to the creation current; using the slope current to generate a slope signal; sampling the slope signal using the PWM signal to generate the dummy ramp signal; and holding the dummy ramp signal as the slope offset signal. These functions may be performed, for example, by an offset generation circuit such as the example circuit shown in FIG. 8.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of operating a DC-DC converter, comprising:
asserting a pulse width modulation (PWM) signal in a switching period to couple an input voltage to an inductor;
sensing an inductor current through the inductor to generate a sensed current signal;
generating a slope compensation signal having a peak amplitude during the switching period;
generating a slope offset signal based on a sum of a predefined threshold with a product of a duty cycle of the PWM signal and the peak amplitude; and
de-asserting the PWM signal during the switching period based on the sensed current signal and the slope offset signal.

2. The method of claim 1 further comprising:
generating a feedback signal using an output voltage of the DC-DC converter;
generating an error signal as a difference between the feedback signal and a voltage reference signal; and
clamping the error signal to not to exceed the slope offset signal to define a clamped error signal.

3. The method of claim 2 wherein de-asserting the PWM signal further comprises de-asserting the PWM signal in response to the sensed current signal exceeding the clamped error signal.

4. The method of claim 1, wherein de-asserting the PWM signal further comprises de-asserting the PWM signal in response to the sensed current signal exceeding a difference of the slope offset signal and the slope compensation signal.

5. The method of claim 1, wherein generating the slope compensation signal further comprises integrating a creation current over the switching period.

6. The method of claim 5, wherein generating the slope offset signal further comprises:
averaging the PWM signal over time to determine the duty cycle from the PWM signal; and
using the duty cycle and the creation current to generate the slope offset signal.

7. The method of claim 5, wherein generating the slope offset signal further comprises:
generating a dummy ramp signal independent from the slope compensation signal by:
generating a slope current proportional to the creation current;
using the slope current to generate a slope signal;
sampling the slope signal using the PWM signal to generate the dummy ramp signal; and
holding the dummy ramp signal as the slope offset signal.

8. A power converter, comprising:
an inductor defining a first lead that defines an output node, and a second lead;
a field effect transistor (FET) defining a drain coupled to the second lead, a source coupled to a power source, and a gate, the FET configured to selectively conduct current from the power source to the inductor to energize the output node with an output voltage;
a latch circuit defining a reset input, and an output coupled to the gate of the FET, the latch circuit configured to generate a PWM signal upon the output;
a slope compensation circuit configured to generate a slope compensation signal having a peak amplitude during a switching period;

an offset generation circuit configured to generate a slope offset signal based on a product of a duty cycle of the PWM signal and the peak amplitude of the slope compensation signal; and a comparator having a first input coupled to a sensed current signal, a second input coupled to the slope offset signal, and a comparison output coupled to the reset input of the latch circuit, the comparator configured to reset the latch circuit during the switching period based on the sensed current signal and the slope offset signal.

9. The power converter of claim 8, wherein the offset generation circuit further comprises:
a ramp offset calculation circuit configured to provide an offset signal based on the product of the duty cycle of the PWM signal and the peak amplitude of the slope compensation signal;
a threshold generator configured to provide a threshold signal representing a predefined threshold; and
a summer defining a first signal input and a second signal input, the first signal input connected to the ramp offset calculation circuit for receiving the offset signal, and the second signal input connected to the threshold generator for receiving the threshold signal, the summer configured to generate the slope offset signal as a sum of the offset signal and the threshold signal.

10. The power converter of claim 8 further comprising:
a compensation current source configured to generate a creation current;
wherein the slope compensation circuit is further configured to use the creation current to generate the slope compensation signal; and
wherein the offset generation circuit further comprises:
a filter defining an input coupled to the output of the latch circuit for receiving the PWM signal, the filter configured to generate a duty signal indicative of the duty cycle of the PWM signal; and
a signal generator configured to generate the slope offset signal using the duty signal and the creation current.

11. The power converter of claim 8 further comprising:
a compensation current source configured to generate a creation current;
wherein the slope compensation circuit uses the creation current to generate the slope compensation signal; and
wherein the offset generation circuit comprises:
a current source defining a current output and configured to generate a slope current as a predefined multiple of the creation current;
a dummy ramp generator defining an input coupled to the current source, and a signal output, the dummy ramp generator configured to generate a slope signal on the signal output, the slope signal being independent from the slope compensation signal and having a slope equal to a slope of the slope compensation signal.

12. The power converter of claim 8, further comprising:
a feedback circuit defining an input coupled to the output node and configured to generate a feedback signal based upon the output voltage; and
an error amplifier defining a feedback input coupled to the feedback circuit for receiving the feedback signal, the error amplifier configured to generate an error signal using the feedback signal.

13. The power converter of claim 8, further comprising:
a compensation current source configured to generate a creation current; and wherein the slope compensation circuit further comprises an integrating amplifier configured to integrate the creation current over the switching period to generate the slope compensation signal.

14. A controller for a power converter, the controller comprising:
a current sense terminal having a sensed current signal, a switch control terminal, and a feedback terminal;
a slope compensation circuit configured to generate a slope compensation signal having a peak amplitude during a switching period;
a latch circuit coupled to the switch control terminal, the latch circuit configured to energize the switch control terminal for a duty cycle as a fraction of the switching period; and
an offset generation circuit configured to generate a slope offset signal upon an offset output, the slope offset signal being a sum of a predefined threshold with a product of the duty cycle of the PWM signal and the peak amplitude of the slope compensation signal; and
wherein the latch circuit is configured to de-energize the switch control terminal during the switching period based on the sensed current signal and the slope offset signal.

15. The controller of claim 14, further comprising:
an error amplifier configured to generate an error signal based on a difference between a reference voltage and a feedback signal from the feedback terminal;
an error clamp configured to generate a clamped error signal using a lesser of the error signal and the slope offset signal; and
wherein the latch circuit is configured to de-energize the switch control terminal during the switching period based on the sensed current signal and the clamped error signal.

16. The controller of claim 14, further comprising:
a compensation current source configured to generate a creation current; and
wherein the slope compensation circuit further comprises an integrating amplifier configured to integrate the creation current over the switching period to generate the slope compensation signal.

17. The controller of claim 14 further comprising:
a compensation current source configured to generate a creation current;
wherein the slope compensation circuit is configured to generated the slope compensation signal using the creation current; and
wherein the offset generation circuit further comprises:
a filter defining an input coupled to the PWM signal, the filter configured to generate a duty signal indicative of the duty cycle of the PWM signal; and
a signal generator configured to generate the slope offset signal using the duty signal and the creation current.

18. The controller of claim 14 further comprising:
a compensation current source configured to generate a creation current; and
wherein the slope compensation circuit is configured to generate the slope compensation signal based on the creation current; and
wherein the offset generation circuit further comprises:
a current source defining a current output and configured to generate a slope current as a predefined multiple of the creation current; and
a dummy ramp generator defining an input coupled to the current source, and a signal output, the dummy ramp generator configured to generate a slope signal on the signal output, the slope signal being independent from the slope compensation signal and having a slope equal to a slope of the slope compensation signal.

19. The controller of claim 14, further comprising:

an error amplifier defining an error output terminal and configured to generate an error signal upon the error output terminal using a feedback signal from the feedback terminal; and a summer defining a first input and a second input, the first input coupled to the error output terminal for receiving the error signal, and the second input coupled to the slope compensation circuit for receiving the slope compensation signal, the summer configured to generate a ramped error signal as a sum or a difference of the error signal and the slope compensation signal.

20. The controller of claim 14, further comprising:

a summer defining a first input, and a second input, the first input coupled to the current sense terminal for receiving the sensed current signal, and the second input coupled to the slope compensation circuit for receiving the slope compensation signal, the summer configured to generate a ramped sensed current signal as a sum or a difference of the sensed current signal and the slope compensation signal.

* * * * *